United States Patent
Mozealous et al.

(10) Patent No.: US 10,498,625 B1
(45) Date of Patent: Dec. 3, 2019

(54) DISTRIBUTED TESTING SERVICE

(71) Applicant: Amazon Technologies, Inc., Seattle, WA (US)

(72) Inventors: David Mozealous, Seattle, WA (US); Arpit Dhandhania, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 443 days.

(21) Appl. No.: 15/294,394

(22) Filed: Oct. 14, 2016

(51) Int. Cl.
*H04L 12/26* (2006.01)
*H04L 29/08* (2006.01)
*H04L 29/06* (2006.01)

(52) U.S. Cl.
CPC ............ *H04L 43/10* (2013.01); *H04L 67/10* (2013.01); *H04L 67/16* (2013.01); *H04L 67/42* (2013.01)

(58) Field of Classification Search
CPC ......... H04L 43/10; H04L 67/10; H04L 67/16; H04L 67/42
See application file for complete search history.

(56) References Cited

U.S. PATENT DOCUMENTS

| | | | |
|---|---|---|---|
| 5,371,883 A | 12/1994 | Gross et al. | |
| 5,544,310 A | 8/1996 | Forman et al. | |
| 6,654,783 B1* | 11/2003 | Hubbard | G06F 17/3002 709/201 |
| 6,804,709 B2* | 10/2004 | Manjure | H04L 43/50 702/123 |
| 9,645,910 B1* | 5/2017 | Kaila | G06F 11/3624 |
| 9,928,151 B1* | 3/2018 | Rodriguez Valadez | G06F 11/26 |
| 2005/0076195 A1* | 4/2005 | Fuller | H04L 67/34 713/1 |
| 2007/0124363 A1* | 5/2007 | Lurie | G06F 9/5072 709/202 |
| 2009/0199193 A1* | 8/2009 | Jackson | G06F 9/5083 718/104 |
| 2014/0278623 A1* | 9/2014 | Martinez | G06Q 10/06 705/7.12 |
| 2016/0259660 A1* | 9/2016 | Gaurav | G06F 9/45558 |

\* cited by examiner

*Primary Examiner* — Joe Chacko
(74) *Attorney, Agent, or Firm* — Robert C. Kowert; Kowert, Hood, Munyon, Rankin & Goetzel, P.C.

(57) ABSTRACT

A distributed testing service for providing responsive and fault-tolerant testing computing platforms within a range of configurable testing conditions. The distributed testing service may be provide an independent worker registry service, a repository service, and multiple worker nodes. Further, the worker nodes may push, or initiate, transmissions to provide status information that may be used to determine appropriate worker nodes to client computers that are requesting worker nodes for executing test cases. The distributed testing service may provide network information for worker nodes to client computers so that communications involving executing the test cases on the worker nodes to not include the worker registry service or the repository service.

20 Claims, 11 Drawing Sheets worker registry service
flowcharts 600

DISTRIBUTED TESTING SERVICE

BACKGROUND

Distributed systems have created great opportunities for implementing more efficient and available system architectures. Systems may no longer be limited by the capabilities of an individual computing system, but may instead share the workload for performing complex computing tasks, maintaining and storing data, or implementing various applications or services among multiple different computer systems.

The ability to leverage the capabilities of multiple different systems, however, can increase the complexity of ensuring that data, status, or other information maintained or shared among multiple systems is consistent or current. Further, when multiple client computers attempt to run multiple, respective tests on multiple remote computer systems, overcoming communication or performance bottlenecks may prove challenging to design or implement.

Figure 1:
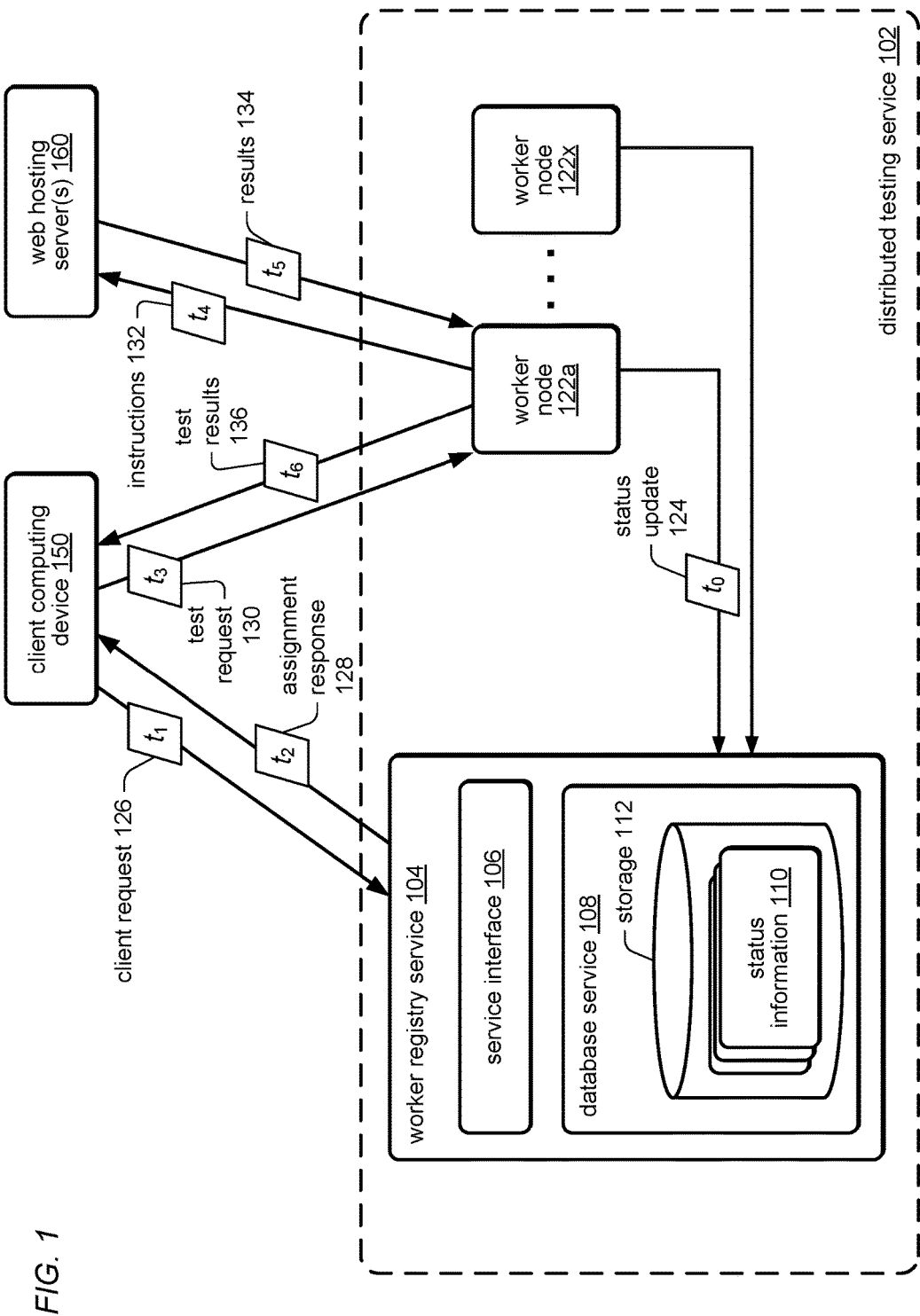
FIG. 1 illustrates a computing environment configured to implement a distributed testing service according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. The circuitry that forms the structure corresponding to "configured to" may include hardware circuits. In some contexts, the structure may be implemented as part of a general purpose computing device that is programmed to perform the task or tasks according to programming instructions.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of a distributed testing service are described for providing responsive and fault-tolerant testing computing platforms within a wide range of configurable testing conditions. Generally, the distributed architecture features are invisible to remote client computers, where the distributed architecture features include hardware systems providing an interface to client computers, hardware systems providing a repository for maintaining and analyzing status information for worker nodes, and multiple hardware systems providing implementations of worker nodes to perform test cases and to communicate with client computers.

Generally, the distributed testing service removes single-point processing and network communication bottlenecks at least in part through distribution of workloads for providing a service interface to multiple client computers, providing a repository service for status information for worker nodes, and providing worker nodes to process test cases for client computers. As an additional consequence of the distributed nature of the various examples of distributed testing service systems, there are no single points of failure in providing a service interface to multiple client computers, providing a repository service for status information for worker nodes, or providing worker nodes to process test cases for client computers. As described below, in different examples, distinct distributed architectures are disclosed, where the functionality of the various architectures invisibly provide services to client computers.

As an example of fault tolerance, a service interface may be configured to provide an interface that is supported by a load balancer that provides incoming requests from client computer to a fleet of servers. In this example, the worker registry service may, through different backup techniques, continue providing service after one or more servers fail. In some cases, the service interface may be implemented as a Representational State Transfer ("REST") application programming interface ("API"). For example, an interface API may be executing across multiple different servers that provide an access point to client computers, where any of the different servers may handle a client request such that one or more worker nodes are mapped, or assigned, to the client to execute test cases.

As another example of fault tolerance, a repository service may be configured to provide an interface that is supported by a load balancer that provides incoming requests from the service interface to a multi-availability database. In this example, the repository service may, through different backup techniques, continue providing service after one or more storage devices fail.

As another example of fault tolerance, a plurality of worker nodes may operate independently of each other, and may periodically or aperiodically provide status information to the repository service. In this way, the repository service may determine, based at least in part on receiving status information from the worker nodes, which worker nodes are available for executing test cases for client computers. In this example, if one or more worker nodes becomes unavailable, the repository service may, in response, avoid assigning the unavailable worker nodes to client computers until the unavailable worker nodes resume sending status updates indicating availability.

Additional embodiments, describing features and configurations of a distributed architecture testing service are discussed below with regard to FIGS. 1-8.

FIG. 1 illustrates a computing environment configured to implement a distributed testing service, distributed testing service 102, according to some embodiments. In this example, a client computing device may access distributed testing service 102 to request one or more worker nodes that may execute test cases on a system under test and collect test results for returning to the client computing device.

In this example, the worker registry service 104 may store status information 110 within a storage device 112, where the storage device 112 may be maintained by a database service 108. The status information may include multiple hardware and software characteristics of a worker node that may be used for matching a test environment of the worker node with criteria provided by a client computer. The worker registry service 104 may also include a service interface 106 that provides an application programming interface (API) for communicating with the client computing device 150.

In this example, worker node 122a may send a status update 124 to the worker registry service 104, where the status update 124 is sent at a time to. The times $t_0$-$t_5$ are used as an example ordering of messages exchanged between the various components of the distributed testing service, the client computer 150, and the system under test, web hosting server(s) 160. Given status update 124 from worker node 122a, the worker registry service 104 may update status information 110, where status information 110 may include status updates form worker nodes 122a-122x.

In some cases, the worker nodes 122a-122x may communicate with the worker registry service 104 using service interface 106, where messages may be provided to the worker registry service 104 using a commonly agreed upon standard for representing data or data objects. In other cases, worker nodes 122a-122x may communicate with the worker registry service 104 using installed agent code that communicates directly with the database service 108, and where the agent code running on the worker nodes may provide status updates using a database schema used by the database service 108.

The client computing device 150 may then send a client request 126 to the worker registry service 104, where the client request may specify worker node criteria for executing one or more test cases. For example the worker node criteria may specify parameters of a testing environment suitable for executing the one or more tests.

The worker registry service 104 may, in response to receiving the client request 126, query the database service 108 for a list of worker nodes that meet the worker node criteria in the client request 126, where the query specifies query parameters corresponding to requirements specified in the worker node criteria. Further, the worker registry service 104, given a list of worker nodes that meet the worker node criteria, may use the status information 110 to sort the list of worker nodes according to a workload capacity available for executing test cases.

In this way, the worker registry service 104 may generate an assignment response 128 that includes one or more worker nodes requested by the client computing device 150, where the assignment response 128 may include identification information for the one or more worker nodes, and where the identification information enables the client computing device 150 to bypass the worker registry service 104 in communicating with the one or more worker nodes. For example, the identification information may be a network address such as an Internet protocol address.

The client computing device 150, given assignment response 128, may communicate directly with the one or more worker nodes indicated in the assignment response 128. In this example, client computing device 150 may send a test request 130 to worker node 122a. In other examples, the client computing device 150 may send test requests to multiple worker nodes. The test request 130 may include instructions for executing the one or more tests that test a system under test, such as web hosting server(s) 160. The test request may include instructions that correspond to a type of test, for example, the instructions may indicate multiple commands, issued from a content browser on the worker node 122a, where the commands are directed to a website hosted by web hosting server(s) 160 to test functionality of a website under development.

In this way, the worker node 122a may, according to instructions from the client computing device in test request 130, initiate execution of the one or more tests, which may include sending instructions 132 to web hosting server(s) 160. In this example, the system under test may receive the instructions, such as Hypertext Transfer Protocol (HTTP) commands, process the instructions, and generate test results to be included in a response to the worker node 122a, where the response is indicated as results 134.

The worker node 122a may generate test results to provide to the client computing device in response to test request 130, where the test results may include tables, metrics, web analytics, or video that captures a content browser interaction with the web hosting server(s) 160 from the worker node 122a sending commands and receiving responses from the web hosting server(s) 160. The worker node 122a may then send test results 136 that include these generated test results.

In this way, the client computing device 150 may test one or multiple systems under test using one or multiple worker nodes, and where there are no communication bottlenecks between the client computing device 150 and the worker nodes because communications between the client computing device 150 and the worker nodes are direct in that they bypass the worker registry service. Further, removing the worker registry service from the communication paths between client computing devices and worker nodes allows the worker registry service to use more resources for performing status updates and responding to requests for worker nodes.

Figure 2:
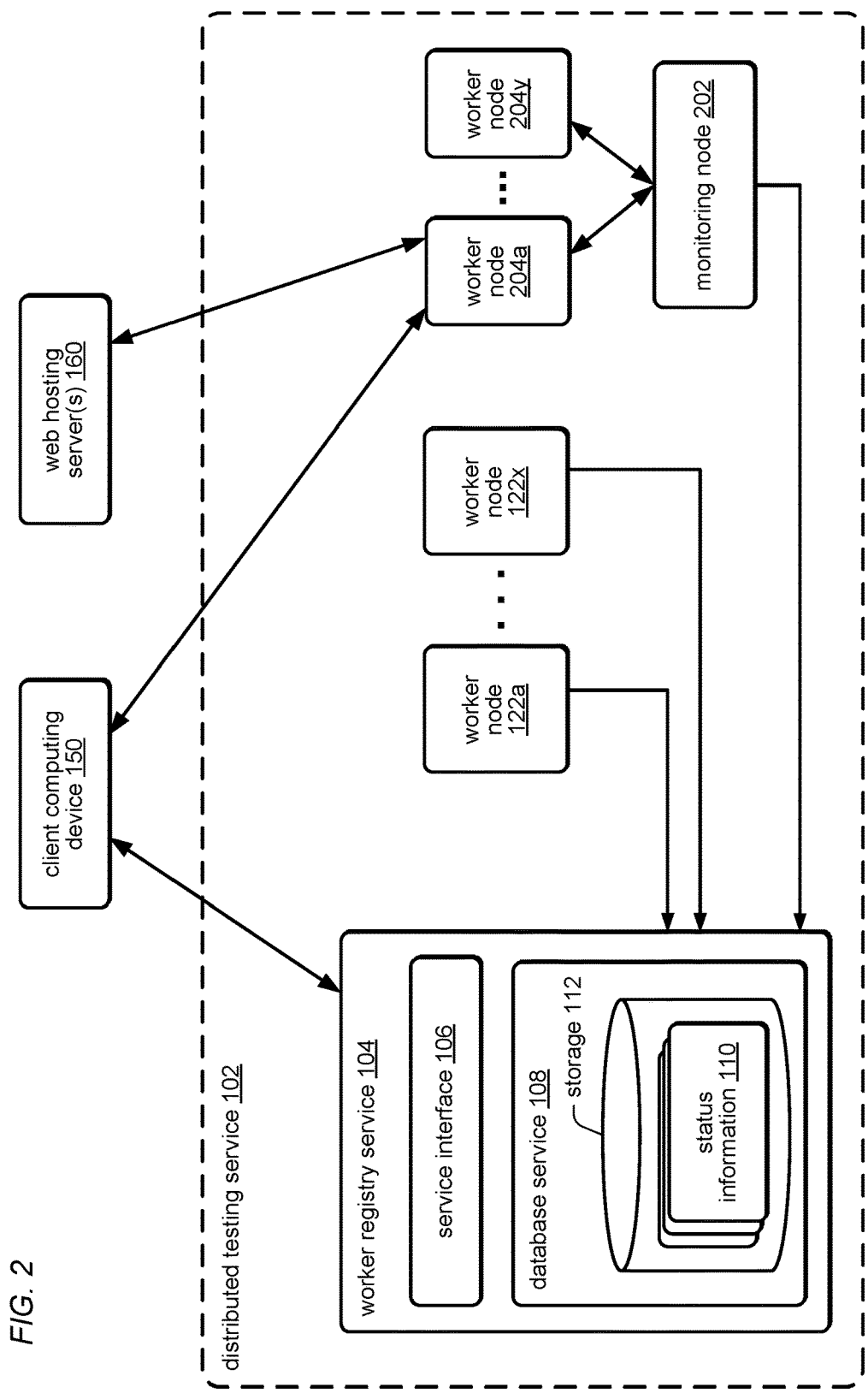
FIG. 2 illustrates a computing environment configured to implement a distributed testing service according to some embodiments.

FIG. 2 illustrates a computing environment configured to implement a distributed testing service, distributed testing service 102, according to some embodiments. In this example, similar to the example of FIG. 1, a client computing device may access distributed testing service 102 to request one or more worker nodes that may execute test cases on a system under test and collect test results for returning to the client computing device.

However, while the similar elements of FIG. 2 operate as described above with regard to FIG. 1, FIG. 2 further includes a monitoring node 202 and worker nodes 204a-204y. In this example, instead of worker nodes 204a-204y communicating directly with the worker registry service 104, the worker nodes 204a-204y communicate directly with the monitoring node 202, where the monitoring node 202 may communicate with the worker registry service 104.

Further, monitoring node 202 may communicate with the worker registry service 104 using service interface 106, where messages may be provided to the worker registry service 104 using a commonly agreed upon standard for representing data or data objects. In other cases, monitoring node 202 may communicate with the worker registry service 104 using installed agent code that communicates directly with the database service 108, and where the agent code running on the monitoring node 202 may provide status updates using a database schema used by the database service 108. This configuration may be implemented in cases where the worker nodes 204a-204y may be unable to communicate directly with the worker registry service 104. In this example, the monitoring node 202 may, without any prompting or requests, provide the worker registry service 104 with status information for one or more of the worker nodes 204a-204y indicating availability for executing test cases, hardware and software characteristics, among other computing environment parameters.

In some cases, worker nodes 204a-204y may initiate communication with the monitoring node 202 to provide status information when a worker node comes online, when a worker nodes restarts, or a periodic or aperiodic intervals. However, in other cases, the monitoring node 202 may initiate communication with one or more of worker nodes 204a-204y to request status information to provide to the worker registry service 104. Communication between the monitoring node 202 and the worker registry service 104 may occur directly or over a network.

While in this example, there is a single monitoring node, in other cases, there may be multiple monitoring nodes, connected to respective sets of worker nodes, where the multiple monitoring nodes are each responsible for providing the worker registry service 104 with status information for their respective sets of worker nodes.

FIGS. 3A-3D illustrate implementations of a distributed testing service, where distinctions between the implementations include distinctions in how components of the distributed testing service communicate. High-level overviews are provided below.

Figure 3A:
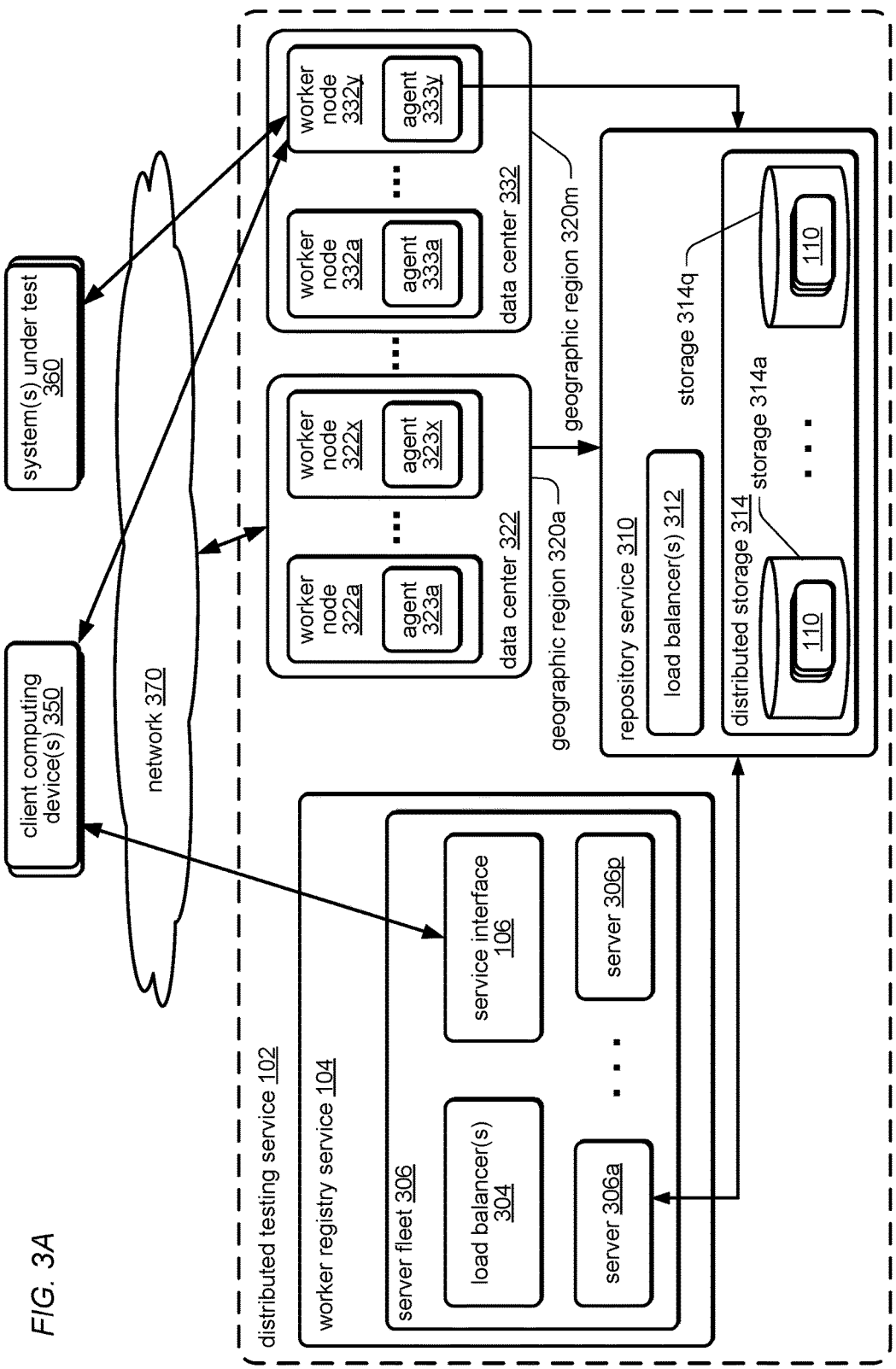
FIGS. 3A-3D illustrate computing environments configured to implement a distributed testing service according to some embodiments.

FIG. 3A illustrates a worker registry service 104 that provides a service interface 106 as a communication access point to client computing device(s) 350, and that allows worker nodes to update status information by accessing a repository service directly using agent code that is configured to use a similar schema as the repository service uses to store the status information.

Figure 3B:
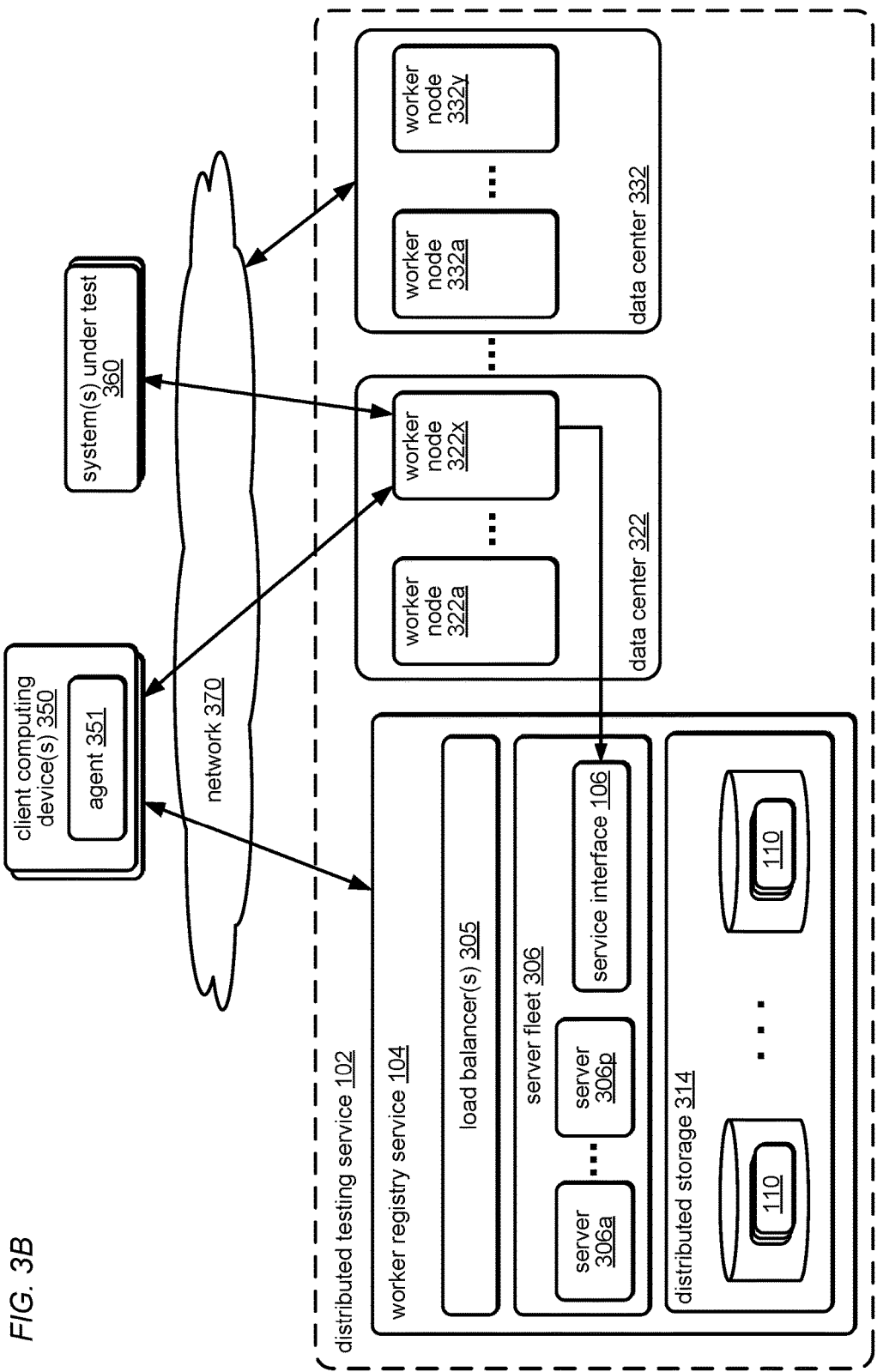

FIG. 3B illustrates a worker registry service 104 that includes load balancer(s) 305, and that provides a service interface 106 as a communications access point to worker nodes for providing status updates, and where the client computing device(s) 150 may access stored status information for worker nodes directly using agent code that is configured to query the repository service. In this way, the client computing device(s) 350 may determine worker nodes to use in executing test cases.

Figure 3C:
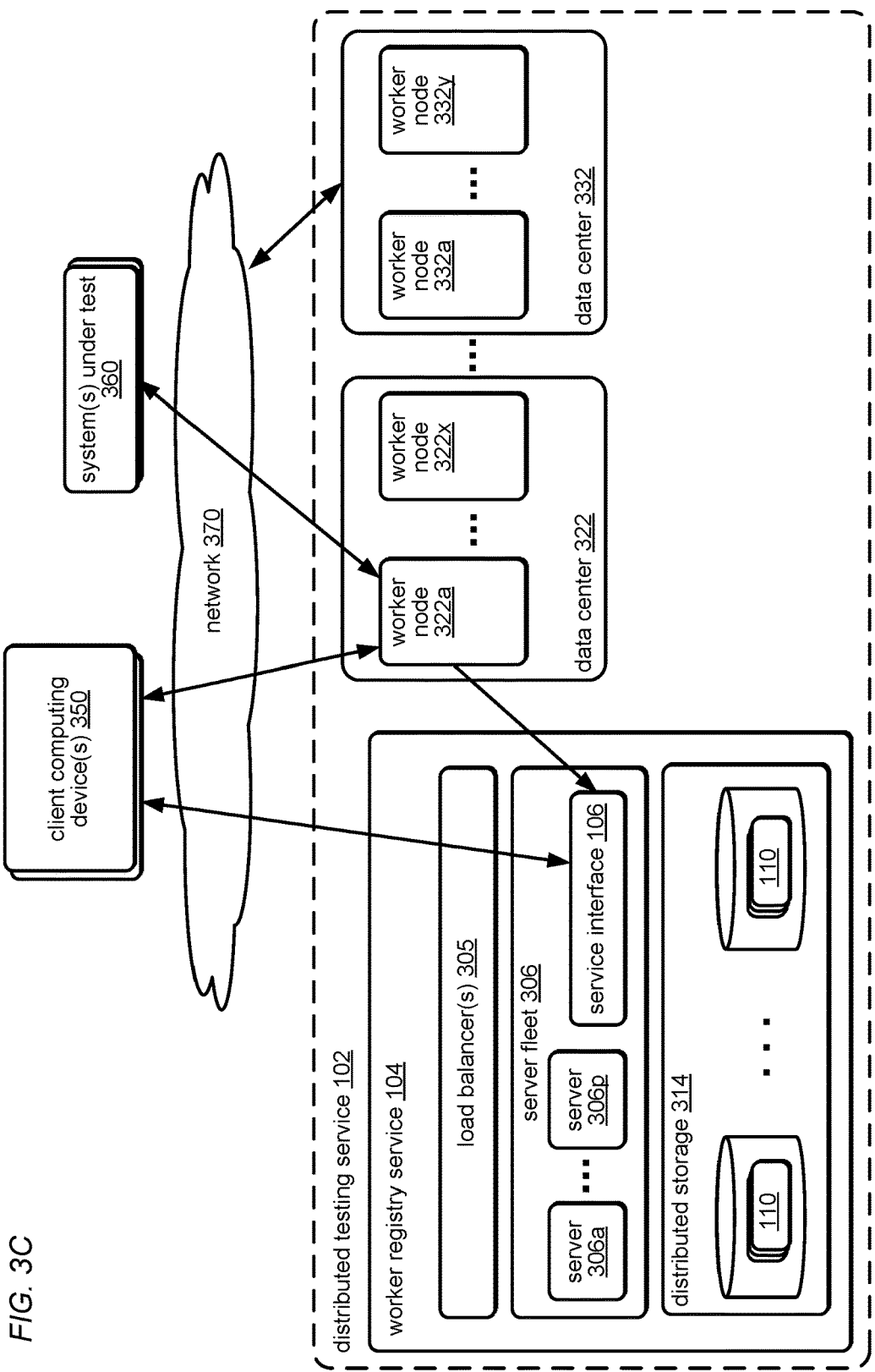

FIG. 3C illustrates a worker registry service 104 that provides a service interface 106 as a communication access point to client computing device(s) 350, and that also provides the service interface 106 as a communications access point to worker nodes for providing status updates. In this way, neither the client computing device(s) 350 nor the worker nodes need to understand a database schema used by the worker registry service 104 in storing the status information for the worker nodes.

Figure 3D:
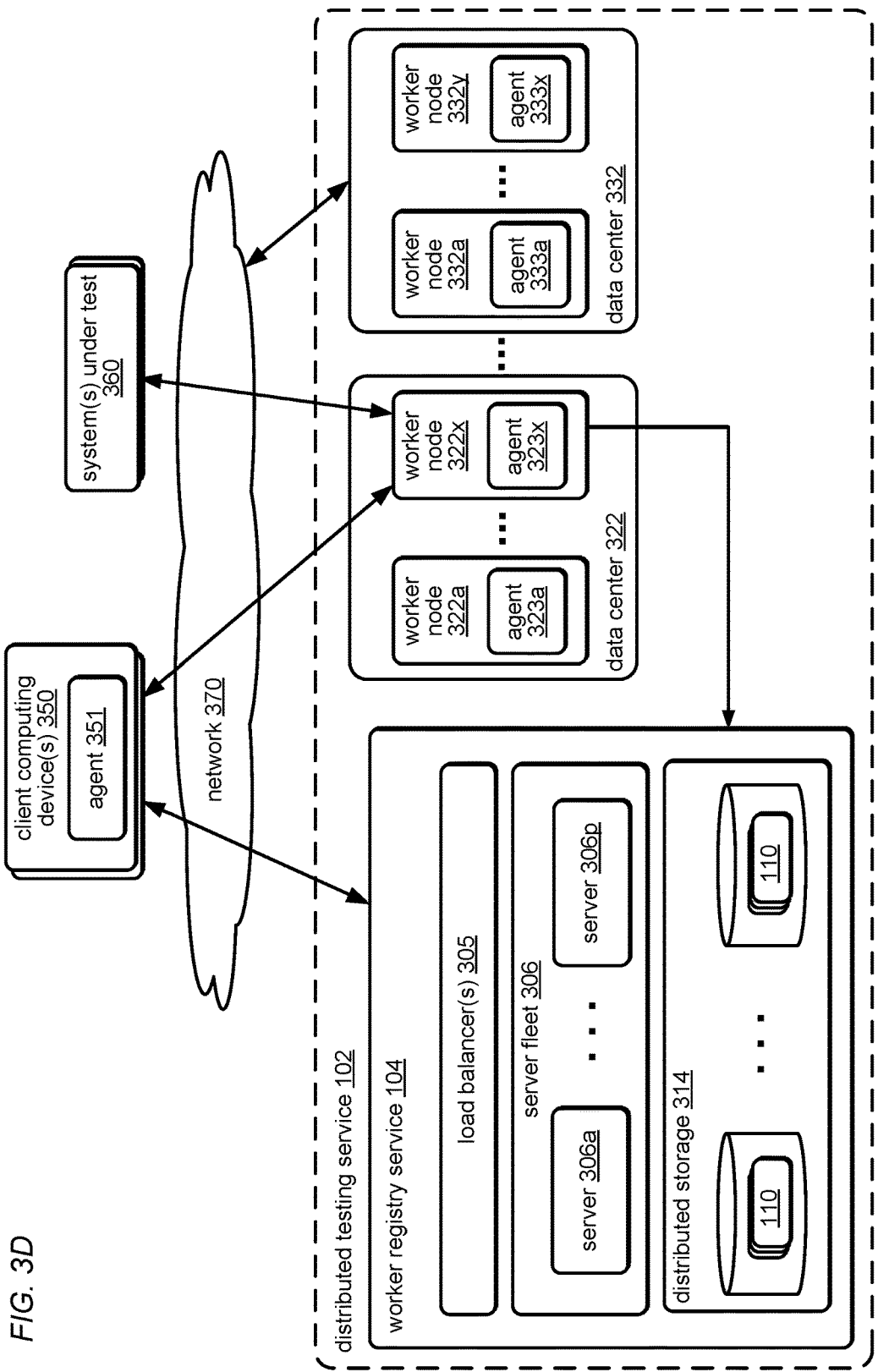

FIG. 3D illustrates a worker registry service 104 that does not provide a service interface to either the client computing device(s) 350 or the worker nodes. Instead, in this example, worker nodes update status information by accessing a repository service directly using agent code that is configured to use a similar schema as the repository service uses to store the status information. Similarly, in this example, the client computing device(s) 150 may access stored status information for worker nodes directly using agent code that is configured to query the repository service.

FIGS. 3A-3D are described in further detail below.

FIG. 3A illustrates a computing environment configured to implement a distributed testing service, distributed testing service 102, according to some embodiments. In this example, the distributed testing service 102 includes a worker registry service 104 that provides a service interface 106 as a communication access point to client computing device(s) 350, and that allows worker nodes to update status information by accessing a repository service directly using agent code that is configured to use a similar schema as the repository service uses to store the status information. In this embodiment, the service interface 106 may be a REST API that provides multiple servers for handling communication via an access point, similarly, in other examples, a service interface may be similarly configured.

For example, the client computing device(s) 150 may access a website, where a page, or browser content, may be configured such that information regarding one or more testing criteria for a testing environment for executing one or more test cases may be specified. The client computing device(s) 350 may then submit a request that includes the information regarding one or more worker node criteria for the one or more test cases, where the request is received by the worker registry service 104 of the distributed testing service 102.

In some cases, the request from a given client computer may include criteria such as parameters that specify a particular operating system type and/or version, particular software applications such as one or more types of content browsers, particular hardware requirements such as processor type, amounts and/or types of memory, networking capabilities such as bandwidth, supported protocols, numbers and/or types of networking ports, one or more geographic zones from which the one or more tests are to execute, among other possible configuration settings that determine a test environment, including hardware and software characteristics of a worker node, under which the one or more tests are to execute.

The worker registry service 104 may include a service interface 106, where in response to receiving a request, via the service interface 106, from a client computer of the client computing device(s) 350 for executing one or more test cases, request, from the repository service 310, one or more worker nodes for executing the one or more test cases. For example, the repository service 310 may, based at least in part on parameters of the request from the client computer, determine one or more worker nodes that satisfy the parameters of the request, and provide network information identifying the one or more worker nodes. Selection of the one or more worker nodes may depend on multiple factors, including whether the worker nodes are configured with content browsers matching the specified testing conditions to execute the test cases, with an operating system type and/or version matching the specified testing conditions—in addition to which of a set of possible worker nodes matching the specified testing environment conditions may have the lightest workload. For example, in the case that the status information is stored as a database table, a query may generate a number of possible worker nodes matching the specified testing environment criteria, and a sort of the query results of worker nodes may provide worker nodes with the lightest workloads.

The worker registry service 104, in response to receiving the network information for the one or more worker nodes from the repository service 310, may send a response to the client computer, where the response includes the network information for the one or more worker nodes. In this way, the client computer may bypass the worker registry service 104 in communicating with the one or more worker nodes to execute the one or more test cases. In other words, a client computer may communicate directly with one or more worker nodes to eliminate any communication or network bottlenecks that may occur if communications between the client computer and the one or more worker nodes were routed through the worker registry service.

In other embodiments, the worker registry service 104 may request, from the repository service 310, status information for the worker nodes, such as status information 110. The worker registry service 104, given the status information 110 received from the repository service 310, may, based at least in part on parameters of the request from the client computer, determine one or more worker nodes that satisfy the parameters of the request, and provide network information identifying the one or more worker nodes to the client computer via the service interface 106. In other words, the worker registry service 104, after determining the one or more worker nodes, may send a response to the client computer, where the response includes the network information for the one or more worker nodes. In this way, the client computer may bypass the worker registry service 104 in communicating with the one or more worker nodes to execute the one or more test cases.

As depicted, the distributed testing service 102 may include a plurality of worker nodes, with different sets of worker nodes distributed across different geographic regions. For example, distributed testing service 102 may include geographic regions 320a-320m, where a given geographic region may be any geographic region of the world defined according to, for example, a city, a country, a county, a continent, or by satellite or GPS coordinates. Further, a given geographic region may include one or more data centers that include a given set of worker nodes, where in this example geographic region 320a includes a data center 322, and where data center 322 includes worker nodes 322a-322x. Similarly, in this example, geographic region 320m includes a data center 332, and where data center 332 includes worker nodes 332a-332y.

As described above, worker nodes in this example use agent code for communicating with the repository service 310, where worker nodes 322a-322x respectively include agent code 323a-323x, and where worker nodes 332a-332y respectively include agent code 333a-333y.

Further, a given worker node may be implemented by one or more hardware processors that either directly implement a given computing environment or that support a virtual, or on demand instance of a computing environment. For example, the worker registry service 104 may, in response to a client request for a particular test environment that is not compatible with an available test environment of an available worker node, transmit a request to a hypervisor of a virtual computing environment for instantiating the worker node with a test environment compatible with the particular test environment as specified by worker node criteria, where the virtual computing environment may be implemented across one or more data centers of the distributed testing service 102. In other cases, the worker registry service 104 may, in response to the currently available worker nodes having insufficient capacity to handle a client request, transmit a request to a hypervisor of a virtual computing environment for instantiating the worker node with a test environment compatible with the particular test environment as specified by worker node criteria, where the virtual computing environment may be implemented across one or more data centers of the distributed testing service 102. In some embodiments, if an additional worker node is unable to be instantiated or otherwise brought online, the worker registry service 104 may create and/or maintain a queue, or other tracking mechanism, of client requests, where the queue may be referenced when workload capacity of the available worker nodes becomes available or when additional virtual instances of worker nodes may be created. Further, the client requests in the queue may be prioritized according to a pricing tier, where clients in a higher pricing tier may be given priority in being allocated, or assigned, worker nodes when the worker nodes have available workload capacity or otherwise come online. In this way, clients that pay more to be in a higher pricing tier are allocated worker nodes before clients that pay less to be in a lower pricing tier.

In some embodiments, worker nodes may, without any prompting or requests, provide the worker registry service 104, via the repository service 310, with status information indicating availability for executing test cases. For example, worker nodes may initiate, or push, communications to provide status information in response to a worker node coming online, in response to a worker nodes restarting, or in response to a periodic or aperiodic interval elapsing. The status information may include multiple parameters describing capabilities and/or characteristics of the hardware and software configurations of a worker node, where the status information is sufficient for identifying a given worker node as capable of executing one or more test cases for a client computer according to the parameters specifying criteria for a testing environment requested by a client computer. Example status information is further discussed with regard to FIG. 4.

In this embodiment, the worker registry service 104 includes load balancer(s) 304, and a server fleet 306, where the service fleet 306 includes servers 306a-306p. The service interface 106 may, in response to receiving a request from a client computer for executing one or more test cases, provide the request to the load balancer 304. The load balancer(s) 304 may receive the request, and determine, based at least in part on one or more load balancing techniques, a server, for example server 306a, from among the server fleet 306 for communicating with the repository service 310, where server 306a may also send a response to the client computer with network information for one or more worker nodes. Similarly, the load balancer(s) 304 may handle multiple requests from multiple client computers, and the load balancers 304 may distribute one or more of the multiple requests to respective servers of the server fleet for handling the multiple requests.

In some cases, a given server, in this example server 306a, from the server fleet 306 may request status information from the repository service 310, and the server, given a response from the repository service 310 that includes the status information, may determine one or more worker nodes to assign to a requesting client computer. In this example, servers 306a-306p may use agent code for communicating with the repository service 310, where servers 306a-306p may be configured to directly access, or query, the status information 110 stored by the repository service 310.

Further, in handling a client request, the server 306a may analyze each individual criteria parameter of the request from the client computer to a corresponding parameter from the status information for a given worker node to determine whether the parameter for the worker node satisfies the individual parameter—where this process may continue, or iterate, for each of the parameters of the request from the client computer. In this way, the server 306a may determine the one or more worker nodes to assign to the client computer, and the server 306a may generate and send a response to the client computer that includes network information for the one or more worker nodes.

In other cases, the server 306a may, instead of requesting status information and determining worker nodes, send the client computer request to the repository service 310 so that the repository service 310 may determine one or more worker nodes that satisfy the parameter requirements of the client request. Further, the iterative process for determining the one or more worker nodes to provide to the client computer may proceed similarly on the repository service 310 as described above with regard to a server operating within the worker registry service 104.

In this embodiment, the repository service 310 includes load balancer(s) 312, and a distributed storage 314, where the distributed storage includes storage devices 314a-314q. The load balancer(s) 312 may receive requests from the worker registry service 104 and retrieve status information 110. Status information 110 may be stored using various backup techniques, including where the distributed storage implements a multi-availability, or redundant, database that is fault tolerant. Further, the load balancer(s) 312 may handle multiple requests for either status information 110 or multiple status updates from one or more worker nodes.

The distributed testing service 102 may also include multiple data centers, including data centers 322 and 332, where data center 322 includes worker nodes 322a-322x, and where data center 332 includes worker nodes 332a-332y. Worker nodes may, without any prompting or requests, provide the repository service 310, either directly using agent code, or in other cases using a service interface, with status information indicating availability for executing test cases and hardware and software characteristics.

For example, worker nodes may initiate communication to provide status information when a worker node comes online, when a worker nodes restarts, or a periodic or aperiodic intervals. Communication between the worker nodes and the repository service 310 may occur directly or over a network (not shown). The status information 110 may include multiple parameters describing capabilities and/or characteristics of the hardware and software configurations of a worker node, where the status information is sufficient for identifying a given worker node as capable of executing one or more test cases for a client computer according to the parameters specifying testing environment criteria requested by a client computer. Example status information is further discussed with regard to FIG. 4.

In this example, agent code modules may be configured to implement an application programming interface (API) that is consistent with an API provided by the repository service 310. In this way, a worker node may communicate with the repository service 310, where in some cases, no handshaking occurs between the worker node and the repository service 310, and communication moves in one direction, from the worker node to the repository service 310. Similarly, the repository service 310 may also communicate with the worker registry service 104, where the servers of the server fleet 306 may be configured to implement an API for communicating with the repository service 310. In this way, additional worker nodes may come online and be considered available by installing an agent code module to provide status information.

FIG. 3B illustrates a computing environment configured to implement a distributed testing service, such as distributed testing service 102, according to some embodiments. In this example, distributed testing service 102 includes the worker registry service 104 that provides a service interface 106 as a communications access point to worker nodes for providing status updates, and where the client computing device(s) 150 may access stored status information for worker nodes directly using agent code that is configured to query the repository service. In this way, the client computing device(s) 350 may determine worker nodes to use in executing test cases.

In this example, the client computing device(s) 350 may include respective agent code modules, such as agent code 351, configured to implement an application programming interface (API) that is consistent with an API provided by the distributed storage 314, or in the case where the worker registry service 104 includes a repository service, with the repository service. In this way, the client computing device(s) 350 may query the worker registry service 104 to retrieve status information for the worker nodes to determine one or more worker nodes to use for executing test cases.

Further, the service interface 106 may be used to communicate with the worker nodes without the worker nodes needing agent code for interfacing with a database schema used by the worker registry service 104. In this way, the worker nodes may provide status updates to the worker registry service 104 without having knowledge of the database schema used by the worker registry service 104 to store the status information, thereby allowing the worker nodes a more generic, or general format for providing status updates, such as with JavaScript Object Notation (JSON) objects, or other data representation formats.

FIG. 3C illustrates a computing environment configured to implement a distributed testing service, such as distributed testing service 102, according to some embodiments. In this example, distributed testing service 102 includes the worker registry service 104 that provides a service interface 106 as a communication access point to client computing device(s) 350, and that also provides the service interface 106 as a communications access point to worker nodes for providing status updates. In this way, neither the client computing device(s) 350 nor the worker nodes need to understand a database schema used by the worker registry service 104 in storing the status information for the worker nodes.

In this example, neither the client computing device(s) 350 nor the worker nodes include agent code for accessing the stored status information, which may be stored according to a particular database schema, with the worker registry service 104. Instead, the client computing device(s) 350 may query the worker registry service 104 via service interface 106 to retrieve status information for the worker nodes to determine one or more worker nodes to use for executing test cases or to request worker nodes.

Further, the service interface 106 may be used to communicate with the worker nodes without the worker nodes needing agent code for interfacing with a database schema used by the worker registry service 104. In this way, the worker nodes may provide status updates to the worker registry service 104 without having knowledge of the database schema used by the worker registry service 104 to store the status information, thereby allowing the worker nodes a more generic, or general format for providing status updates, such as with JavaScript Object Notation (JSON) objects, or other data representation formats.

FIG. 3D illustrates a computing environment configured to implement a distributed testing service, such as distributed testing service 102, according to some embodiments. In this example, distributed testing service 102 includes the worker nodes update status information by accessing a repository service directly using agent code that is configured to use a similar schema as the repository service uses to store the status information. Similarly, in this example, the client computing device(s) 150 may access stored status information for worker nodes directly using agent code that is configured to query the repository service.

In this example, both the client computing device(s) 350 and the worker nodes include agent code for accessing the stored status information, which may be stored according to a particular database schema. In other words, via the agent code, the client computing device(s) 350 may query the distributed storage 314 to retrieve status information for the worker nodes to determine one or more worker nodes to use for executing test cases or to request worker nodes.

Further, via the agent code, the worker nodes may provide status updates to the worker registry service 104 using the database schema used by the worker registry service 104 to store the status information.

Figure 4:
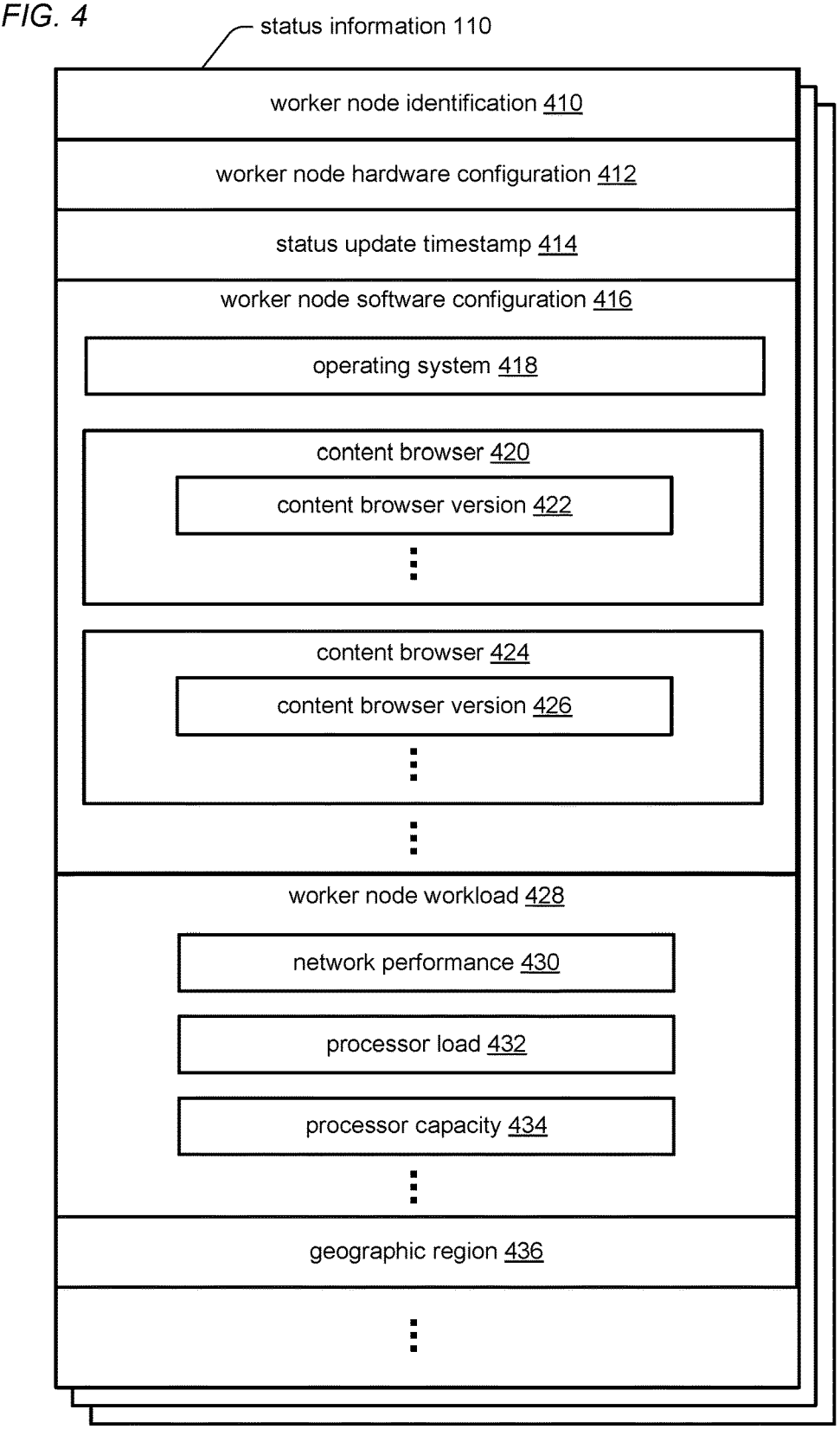
FIG. 4 illustrates example status information received from worker nodes in a distributed testing service according to some embodiments.

FIG. 4 illustrates example status information from worker nodes in a distributed testing service according to some embodiments. As discussed above with regard to FIGS. 1-3, a worker node may provide a worker registry service, or a repository service, with status information that may serve as a basis for assigning a worker node to a client computer for executing one or more test cases under specified test conditions within a client computer request. In some cases, when a worker node first comes online, starts up, or is added to set of worker nodes, the worker node may send a registration message that includes all worker node configuration information, including each of the fields of information depicted in status information 110 in FIG. 4. As a worker node continues operating, subsequent status updates may include information that has been added or changed, but does not include information that remains unchanged. In other cases, the status update may not include any configuration changes, and instead only include an indication of availability that the worker registry service may interpret as the worker node being alive and available. In this way, status updates from a worker node avoid wasting network bandwidth.

As depicted, status information 110 may be a data object or database table that may include worker node identification 410, worker node hardware configuration 412, status update timestamp 414, worker node software configuration 416, and worker node workload 428, among other characteristics of the worker node usable for determining whether or not a worker node is suitable, or capable, of performing particular test cases according to specified criteria, such as criteria indicating hardware and/or software testing environments or conditions. Worker node software configuration 416 may further include operating system information, such as operating system 418, content browser information, such as content browser 422 and content browser 424, among other possible installed content browsers. For example, content browser 420 may specify Firefox™, and a content browser version 422 field may specify a particular version of the content browser, among other possible fields for further specifying the content browser 420. Similarly, content browser 424 may specify a particular browser, and content browser version 426 may specify version information for content browser 424. Operating system 418 may specify an operating system type and version, including driver information, software patches, among other characteristics describing the operating system for the worker node.

Worker node identification 410 may be a network address, or some other identifying value. Worker node hardware configuration 412 may specify hardware characteristics of the worker node such as processor types, memory configurations and sizes, network interface ports, graphics processors, network interface card performance characteristics, display characteristics, among any other hardware feature descriptions. Status update timestamp 414 may be maintained by the repository service or by the worker registry service, and may be updated when status information is received. Similarly, the worker registry service or repository service may use the status update timestamp 414 information to determine whether or not a worker node is available or active depending upon a quantity of elapsed time since a status update has been received for the worker node.

Worker node software configuration 416, in addition to including operations system 418, content browser 420, and content browser 424, may further include fields for information for other installed applications, software patches, and settings information.

Worker node workload 428 may specify network metrics in a network performance 430 field, a processor load 432, and a processor capacity 434, among other characteristics describing worker node workloads. For example, the status information may also specify a number of currently executing content browser sessions, sessions of other software applications, a number of test cases currently being executed, among other performance or workload metrics. In this way, the worker node workload 428 information may be used for selecting a worker node from among a plurality of worker nodes that may otherwise satisfy testing environment conditions for executing one or more test cases for a client computer, where a worker node with greater available processing power may be selected over a worker node with less available processing power.

A field of the status information 110 may include a geographic region 436 in which the worker node is located, where a geographic region may be described as discussed above. As described above, each field of data specifying a hardware or software characteristics of a worker node may be evaluated according to each parameter of a client computer request specifying hardware or software characteristics. For example, the worker registry service or the repository service may for each given parameter of a client computer request for a worker node, index a corresponding field of the status information to determine whether or not the worker node satisfies the given parameter of the client computer request. In this way, one or more worker nodes may be identified as being suitable for performing the one or more test cases according to specified testing conditions in a client computer request.

Figure 5:
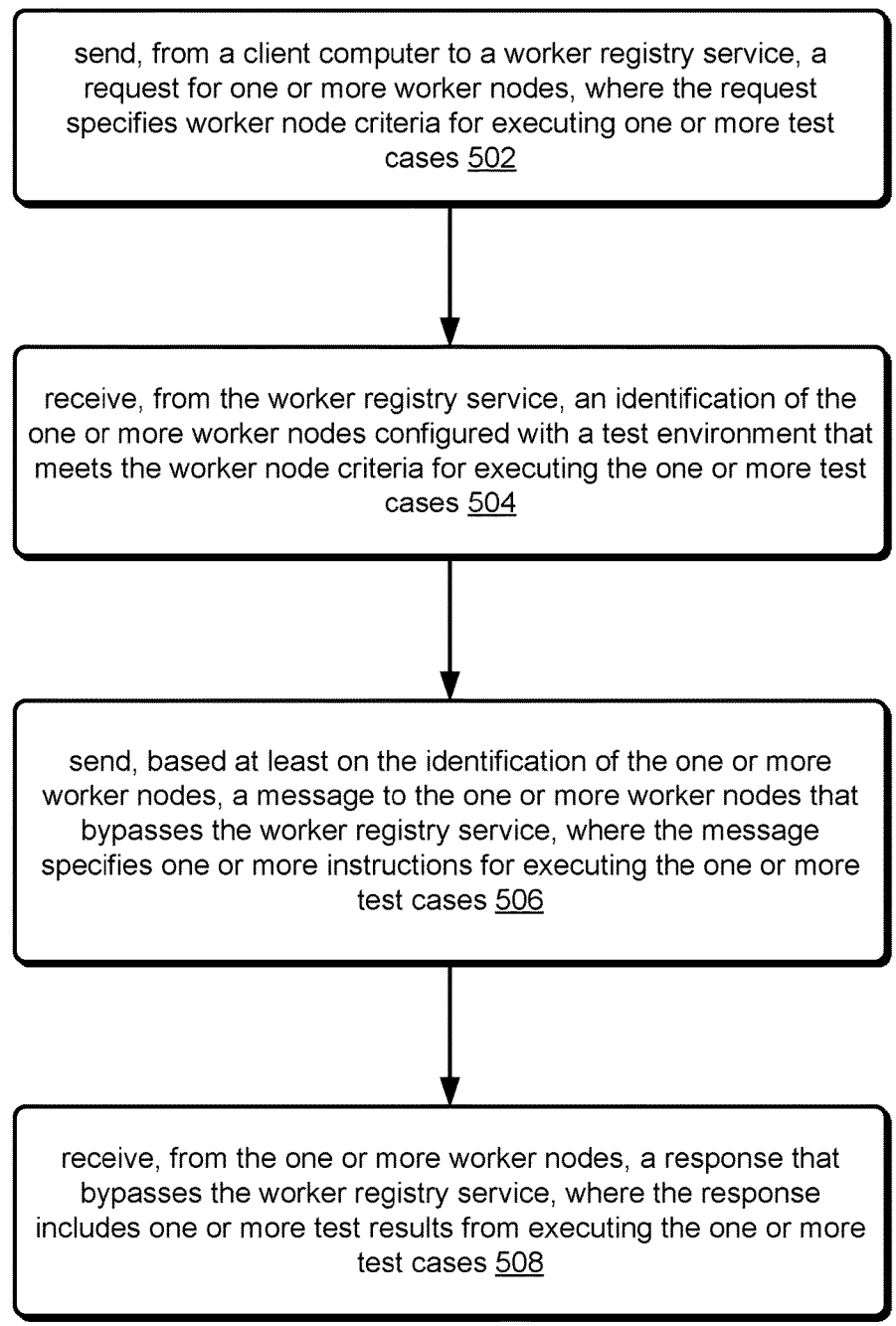
FIG. 5 is a high-level flowchart illustrating an interaction of a client computer with a distributed testing service according to some embodiments.

FIG. 5 is a high-level flowchart illustrating an interaction of a client computer with a distributed testing service according to some embodiments. Flowchart 500 may be performed by a client computer of the client computing device(s) 350 communicating with distributed testing service 102.

In this example, a client computer may send, to a worker registry service 104, a request for a worker node, or multiple worker nodes, where the request specifies a worker node criteria, such as a processor configuration suitable for executing one or more test cases, as depicted at 502. For example, the client computer may access a website via a Uniform Resource Locator (URL) address using content browser, where the website includes a form for accepting parameters specifying worker node criteria such as a hardware configuration, software configuration, or other characteristics describing a testing environment. The website may further allow the client computer to send a request to the worker registry service 104, where the request includes parameters specifying the worker node criteria provided in the online form. In other cases, the client computer may, instead of accessing a website, use installed agent code implementing an API compatible with the service interface 106 of the worker registry service 104, to send a request for worker nodes for executing one or more test cases, where the request includes parameters specifying the worker node criteria for testing conditions such as a testing environment for executing the one or more test cases.

The client computer may also receive, from the worker registry service 104, a worker node identification that identifies a worker node configured with a test environment that meets the worker node criteria for executing the one or more test cases, as depicted at 504. The worker node identification may be a network address usable by the client computer to communicate directly to the worker node, where the client computer may send the one or more test cases and instructions, including testing environment conditions, for executing the one or more test cases to the worker node. In some cases, the client computer may request multiple worker nodes according to a single set of parameters specifying a testing environment, or according to different sets of parameters specifying different testing environments.

The client computer may also send, to a network address corresponding to the worker node identification of the one or more worker nodes, a message, or transmission, that bypasses the worker registry service 104, where the message specifies one or more instructions for executing the one or more test cases, as depicted at 506. As noted above, in addition to sending the instructions to the worker node, the client computer may also send instructions for executing the one or more test cases, instructions for collecting test cases results, including debug information, and instructions for returning test case results. The instructions from the client computer to the worker node may be sent directly from the client computer to the worker node, without any communication involving the worker registry service or the repository service.

The client computer may also receive, from the one or more worker nodes, a response that bypasses the worker registry service, where the response includes one or more test case results from executing the one or more test cases, as depicted at 508. The test case results may be sent directly from the worker node to the client computer, without any communication involving the worker registry service or the repository service.

Figure 6A:
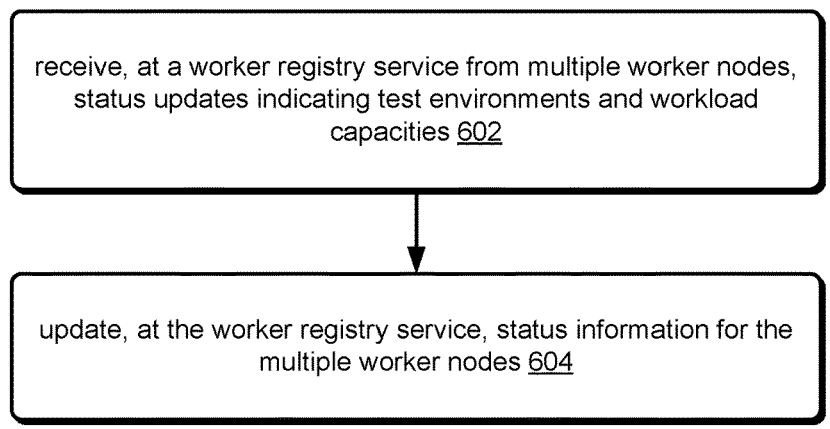
FIGS. 6A and 6B are high-level flowcharts illustrating methods and techniques to implement a distributed testing service according to some embodiments.
Figure 6B:
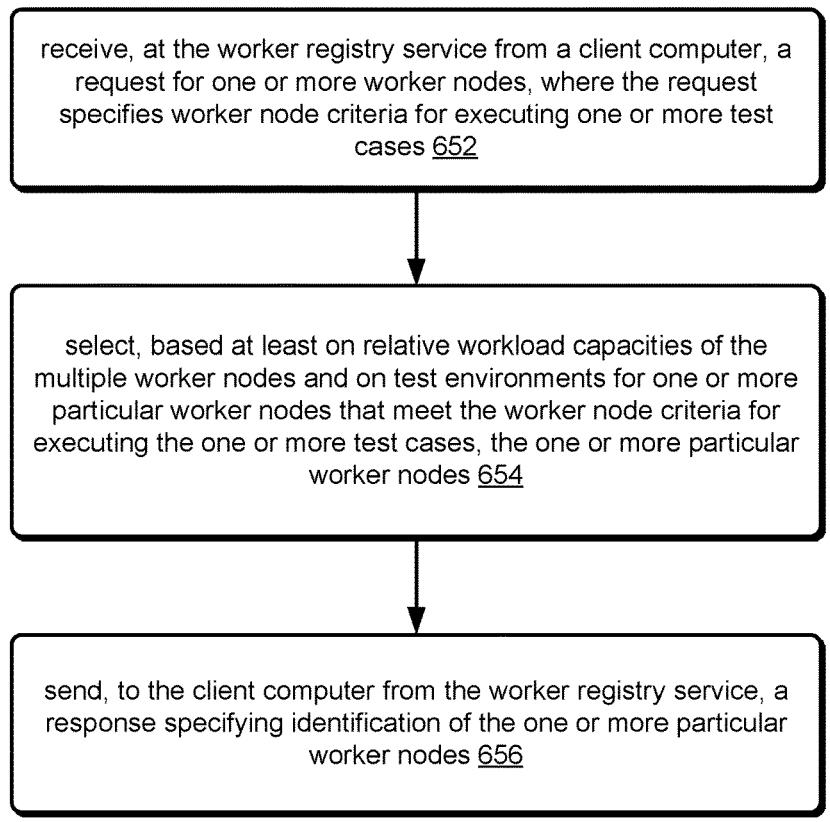

FIGS. 6A and 6B are high-level flowcharts illustrating methods and techniques to implement a distributed testing service according to some embodiments. Flowcharts 600 may be performed by a worker registry service, such as worker registry service 104, communicating with client computers, worker nodes, and monitoring nodes.

With regard to FIG. 6A, worker registry service 104 may receive, from a plurality of worker nodes, a plurality of status updates indicating respective test environments and respective workload capacities, as depicted at 602.

Further, the worker registry service 104 may update, in response to receiving a status update from a worker nodes, status information for the worker node, and for each worker node providing a status update, as depicted at 604. For example, the worker registry service 104 may maintain a table, or data objects, for storing status information received from individual worker nodes. As discussed above, the worker registry service 104 may also generate and store a status update timestamp, such as status update timestamp 414, indicating a time at which the status information was received from a worker node. Further, the worker registry service 104 may reference a configurable threshold timeout value for determining, based on a comparison to the status update timestamp 414, whether or not a particular worker node, identifiable by worker node identification 202 of the status information 110, is active and capable of receiving test cases to execute. For example, if a worker node has not provided a status information update for a time greater than the threshold timeout value, then the worker registry service 202 may not consider the worker node as a candidate for executing test cases.

With regard to FIG. 6B, the worker registry service 104 may receive, from a client computer, a request for one or more worker nodes, where the request may specify worker node criteria for executing the one or more test cases, as depicted at 652. As discussed above, a test environment may be specified with parameters in the worker node criteria indicating various hardware and/or software characteristics of a worker node for executing the one or more tests. For example, the parameters may specify information that may be used to match one or more of the fields in status information 110 described in FIG. 4 for one or more worker nodes.

The worker registry service 104 may also select—based at least in part on relative workload capacities of the plurality of worker nodes and on test environments for particular worker nodes that meet, or are compatible with, the worker node criteria for executing the one or more test cases—the one or more particular worker nodes, as depicted at 654. As described above with regard to FIG. 2, parameters from worker node criteria in a client request may be compared to information in the status information for the particular worker node to determine that the particular worker node satisfies, or exceeds, requirements for a test environment in which to execute the one or more test cases.

The worker registry service 104 may also send or transmit, to the client computer, a response specifying network information of the particular worker nodes such that communication of test results for the one or more test cases between the client computer and the particular worker node using the network information bypasses the worker registry service 104, as depicted at 656. For example, the worker registry service 104, may provide the client computer with the network information for directly communicating with the particular worker nodes.

In this way, the particular worker nodes, after completing execution of the one or more test cases, may directly provide test result information to the client computer without the worker registry service 104 becoming a bottleneck for network communication. In some cases, the test result information may be a video that includes a recording of one or more content browsers, or other software applications, executing the one or more test cases.

Figure 7A:
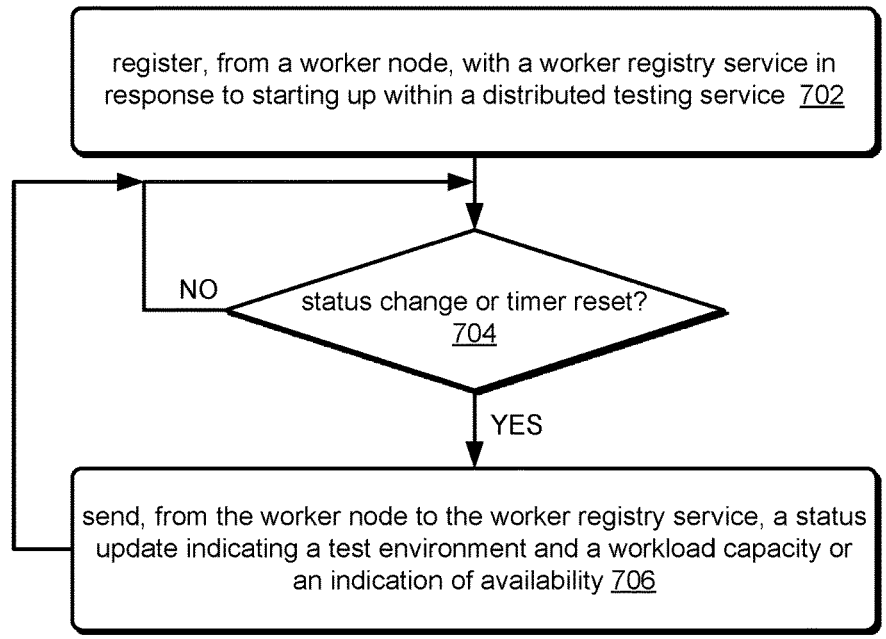
FIGS. 7A and 7B are high-level flowcharts illustrating methods and techniques to implement a distributed testing service according to some embodiments.
Figure 7B:
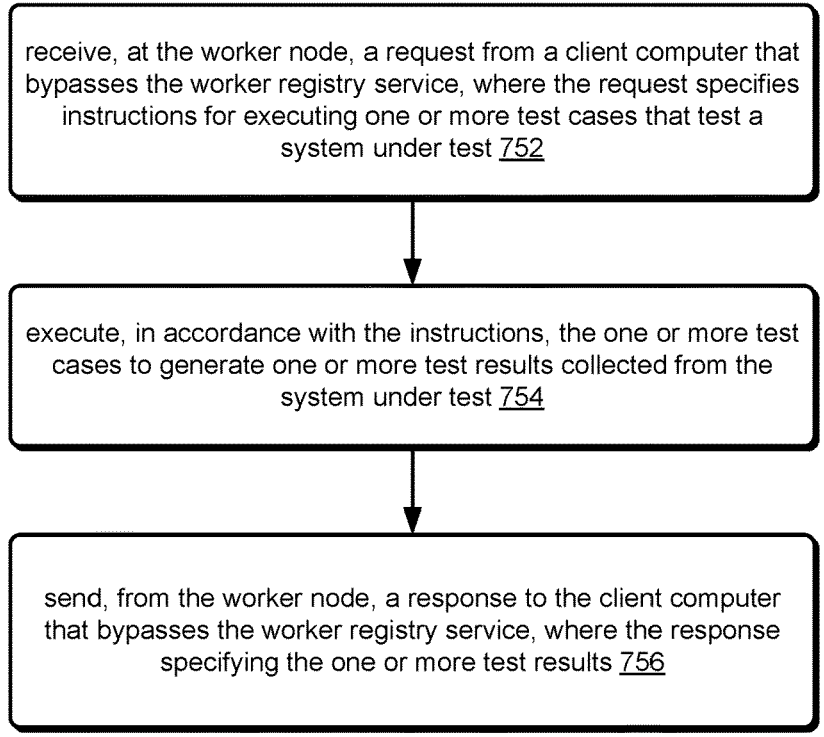

FIGS. 7A and 7B are high-level flowcharts illustrating methods and techniques to implement a distributed testing service according to some embodiments. Flowcharts 700 may be performed by a given worker node communicating with the worker registry service 104, client computing device(s) 350, and in some cases, monitoring nodes. In other embodiments, the worker node may communicate with a repository service.

With regard to FIG. 7A, a worker node may be deployed within the distributed testing service 102, where the distributed testing service 102 includes the worker registry service 104. For example, a worker node may be added to a data center, start up, and brought online for a first time, and in response to starting up, the worker node may register with a worker registry service 104, where registering may include providing an initial status update including at least some of the information depicted in status information 110 of FIG. 4, as depicted at 702. Further, if a status change occurs, or if a timer resets for sending a heartbeat or indication of availability, as depicted at 704, the worker node may, as depicted at 706, send, to the worker registry service 104, a status update indicating a test environment and a workload capacity, among other possible status information such as hardware and/or software characteristics, where the worker node is one of a plurality of worker nodes. As discussed above, the worker registry service 104 may use the status update to select particular worker nodes for executing one or more test cases from a client computer. With regard to the timer reset, a worker node may periodically or aperiodically send a status update message to the worker registry service, or to the repository service. In some examples, the status update may include an indication of availability, without any indication of hardware or software configuration changes. As depicted at 704, if a worker node does not undergo a status change or detects a timer reset, then the worker node may wait, or continue with other processing tasks.

As discussed above with regard to FIG. 6, the worker registry service, or the repository service, may select the worker node to execute the one or more test cases for the client computer. Further, in response to a selection of worker node, the client computer may be provided with network information for communicating directly with the worker node.

With regard to FIG. 7B, the worker node may receive, a request from a client computer that bypasses the worker registry service 104, where the request may specify instructions for executing one or more test cases that test a system under test, as depicted at 752. For example, the client computer may send a request that indicates a script, or other instructions, for specifying or defining conditions under which to execute the one or more test cases, and for specifying one or more systems, such as a website, to test.

The worker node may also execute, in accordance with the instructions, the one or more test cases to generate one or more test results collected from the system under test and/or from results captured at the worker node, as depicted at 754. For example, the worker node may use the script, or instructions provided in the transmission from the client computer to execute the test cases, and to collect test results, where the request may also specify instructions for how, and what type of, information to collect during executing of the one or more test cases.

The worker node may also send a response to the client computer that bypasses the worker registry service, or repository service, where the response specifies the one or more test results generated from executing the one or more test cases, as depicted at 756.

In various embodiments, the components illustrated in FIGS. 1-3 may be implemented directly within computer hardware, as instructions directly or indirectly executable by computer hardware (e.g., a microprocessor or computer system), or using a combination of these techniques. For example, the components of FIGS. 1-3 may be implemented by a system that includes a number of computing nodes (or simply, nodes), each of which may be similar to the computer system embodiment illustrated in FIG. 8 and described below. In various embodiments, the functionality of a given system component (e.g., a component of the distributed system) may be implemented by a particular node or may be distributed across several nodes. In some embodiments, a given node may implement the functionality of more than one system component (e.g., more than one storage system component).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
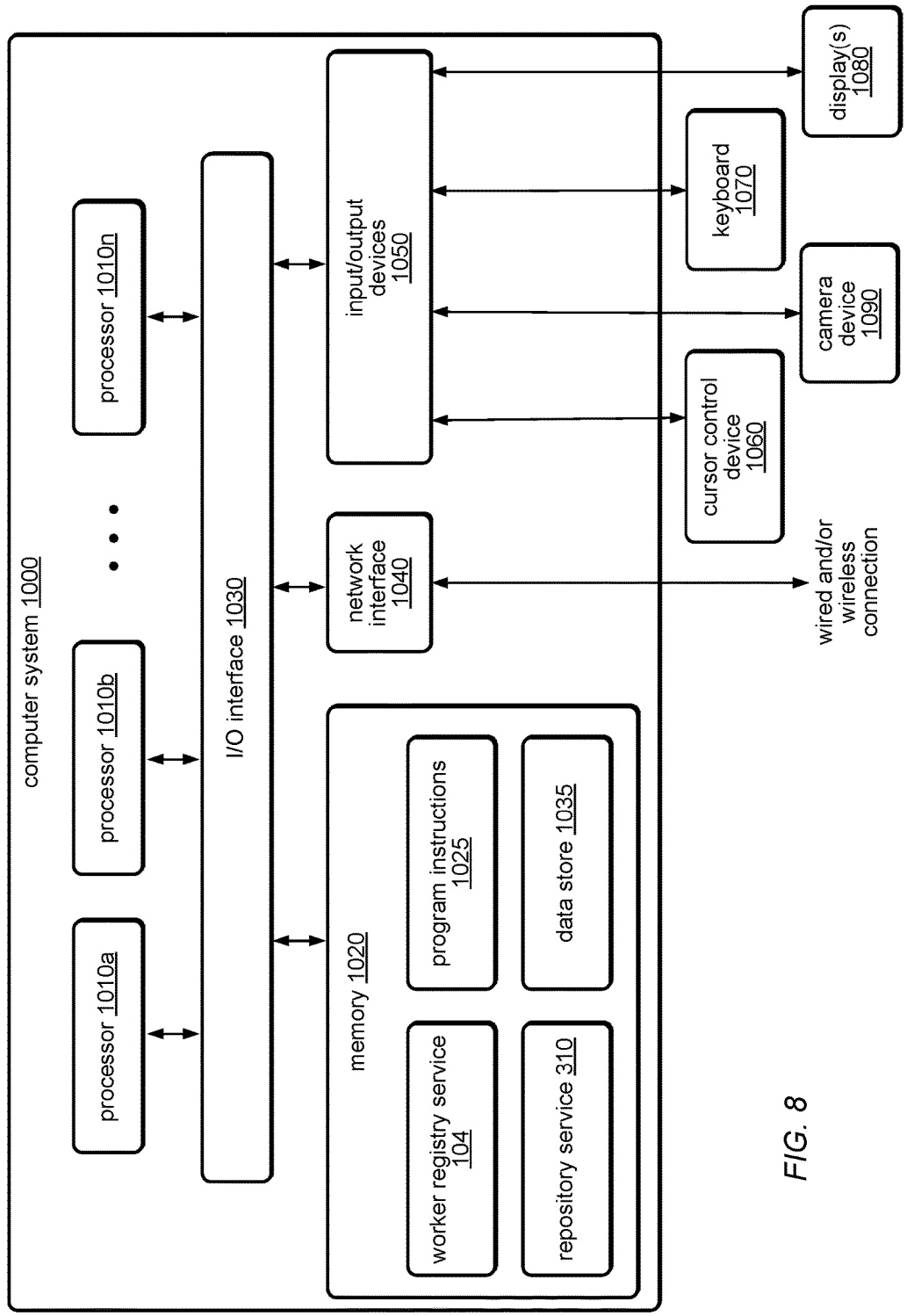
FIG. 8 is an example computer system in a distributed testing service according to various embodiments.

FIG. 8 is a block diagram illustrating a computer system configured to implement at least a portion of the various nodes, systems, or components of the distributed testing service, such as the examples described herein, according to various embodiments. For example, computer system 1000 may be configured to implement various storage nodes of a distributed testing service that stores data on behalf of clients, in different embodiments, or more generally implement any of the various types of nodes or components that may be implemented as part of a distributed testing service. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a distributed system node or client of a distributed system. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory, computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the storage system described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage system may be stored in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 7 (e.g., displays, video cards, audio cards, peripheral devices, other network interfaces such as an ATM interface, an Ethernet interface, a Frame Relay interface, etc.)

It is noted that any of the distributed testing service embodiments described herein, or any of their components, may be implemented as one or more network-based services. For example, the worker registry service, the repository service, and the worker nodes described herein may be offered to clients as a network-based service. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a worker registry service implemented by one or more computing devices comprising one or more hardware processors, the worker registry configured to:
  receive, at the worker registry service from a client computer, a particular request for one or more worker nodes, wherein the particular request specifies worker node criteria for executing one or more test cases;
  select, based at least in part on worker node status information that indicates workload capacities and test environments that meet the worker node criteria, one or more particular worker nodes of the plurality of worker nodes; and
  send, to the client computer, a particular response specifying identification of the one or more particular worker nodes of the plurality of worker nodes; and
a plurality of worker nodes implemented by one or more computing devices comprising one or more hardware processors, wherein the one or more particular worker nodes of the plurality of worker nodes are configured to:
  send, to the worker registry service, a status update indicating a test environment and a workload capacity;
  receive, at the one or more particular worker nodes from the client computer, a different request that bypasses the worker registry service, wherein the different request specifies instructions for executing the one or more test cases that test a system under test;

execute, in accordance with the instructions, the one or more test cases to generate one or more test results collected from the system under test; and send, from the one or more particular worker nodes to the client computer, a different response that bypasses the worker registry service, wherein the different response specifies the one or more test results.

2. The system of claim 1, wherein the worker registry service comprises a service interface to receive the particular request and to send the particular response, wherein the worker registry service includes a server configured with agent code to query a database for the worker node status information, and wherein the agent code is configured to use a database schema for the database.

3. The system of claim 1, wherein the worker registry service comprises a service interface to receive the status updates from the plurality of worker nodes, wherein the worker registry service includes a database configured to respond to queries from agent code installed on the client computer, and wherein the agent code is configured to use a database schema for the database.

4. The system of claim 1, wherein the worker registry service comprises a service interface to receive the particular request from the client computer, to send the particular response to the client computer, and wherein the plurality of worker nodes send the status updates to the worker registry service via the service interface.

5. A method, comprising:

receiving, at a worker registry service from a client computer, a request for one or more worker nodes, wherein the request specifies worker node criteria for executing one or more test cases;

receiving, at the worker registry service from a plurality of worker nodes, a plurality of status updates indicating respective test environments and respective workload capacities;

selecting, based at least in part on the respective workload capacities of the plurality of worker nodes and on test environments for one or more particular worker nodes that meet the worker node criteria, the one or more particular worker nodes of the plurality of worker nodes; and sending, to the client computer from the worker registry service, a response specifying identification of the one or more particular worker nodes.

6. The method of claim 5, wherein the worker node criteria specifies one or more requirements of a test environment including a content browser type, a content browser version, an operating system type, hardware requirements, and network connection requirements.

7. The method of claim 5, wherein, said selecting comprises determining whether the one or more particular worker nodes meet the worker node criteria, and wherein said determining comprises:

for a given worker node of the plurality of worker nodes:

adding the given worker node to a set of potential worker nodes based at least on fields of information in a status update for the given worker node matching or exceeding all of the worker node criteria; and sorting the set of potential worker nodes according to workload capacities, wherein the plurality of status updates include the workload capacities for the set of potential worker nodes.

8. The method of claim 7, wherein the request from the client computer specifies a number of worker nodes, and wherein said selecting the one or more particular worker nodes comprises selecting the number of worker nodes of the potential worker nodes.

9. The method of claim 7, wherein the request from the client computer specifies worker node criteria including a geographic region, and wherein said determining the one or more particular worker nodes comprises adding worker nodes to the set of potential worker nodes based at least on matching the geographic region to a worker node geographic region.

10. The method of claim 8, wherein said selecting comprises querying a repository service that stores the plurality of status updates, and wherein said querying comprises using agent code to query the repository service for the plurality of status updates, and wherein the agent code is configured to use a database schema for the repository service.

11. The method of claim 7, wherein the worker node is a virtual computing instance within a virtual computing environment, and wherein the method further comprises:

determining, that the workload capacities of the potential set of worker nodes is insufficient to handle the client request; and the worker registry service, in response to said determining that the workload capacities are insufficient to handle the client request, transmitting a different request to a hypervisor of the virtual computing environment for instantiating another worker node with a corresponding test environment compatible with the worker node criteria, wherein the one or more particular worker nodes is determined to include the other worker node instantiated with the corresponding test environment compatible with the worker node criteria.

12. The method of claim 5, wherein the worker node is a virtual computing instance within a virtual computing environment, and wherein the method further comprises:

the worker registry service, in response to a client request for a particular test environment that is not compatible with an available test environment of an available worker node, transmitting a different request to a hypervisor of the virtual computing environment for instantiating the worker node with a test environment compatible with the particular test environment.

13. The method of claim 5, further comprising:

configuring an additional worker node added to a data center comprising one or more of the plurality of worker nodes;

receiving, at the worker registry service from the additional worker node, a status update for the additional worker node; and adding, in response to said receiving the status update from the additional worker node, the additional worker node to the plurality of worker nodes from which one or more worker nodes are be selected for performing additional test cases.

14. The method of claim 5, further comprising:

determining, in response to not receiving a status update from a given worker node for a period of time greater than a threshold amount of time, that the given worker node is unavailable for performing additional test cases; and removing, in response to said determining that the given worker node is unavailable, the given worker node from consideration in selecting worker nodes for performing additional test cases, wherein said removing includes modifying a field of status information for the given worker node to indicate unavailability.

15. A method, comprising:
sending, from a worker node, a status update for a worker registry service, wherein the status update indicates a test environment and a workload capacity;
receiving, at the worker node, a request from a client computer that bypasses the worker registry service, wherein the request specifies instructions for executing one or more test cases that test a system under test;
executing, in accordance with the instructions, the one or more test cases to generate one or more test results collected from the system under test; and
sending, from the worker node, a response to the client computer that bypasses the worker registry service, wherein the response specifies the one or more test results collected from the system under test.

16. The method of claim 15, wherein said sending comprises:
sending, from the worker node to a monitoring node instead of the worker registry service, the status update; and
sending, from the monitoring node to the worker registry service, the status update from the worker node.

17. The method of claim 16, wherein the worker node is not configured with an application programming interface compatible with a database schema used by a database of the worker registry service, and wherein the monitoring node is configured with an application programming interface compatible with the database schema used by the database of the worker registry service.

18. The method of claim 15, wherein said sending the status update is in response to a change in configuration of the worker node relating to change in an installed software application, a change in one or more hardware components, or to a change in both installed software applications and one or more hardware components.

19. The method of claim 15, wherein said request from the client computer further specifies instructions for collecting or recording the one or more test results, wherein the one or more test cases include executing one or more scripts for processing one or more Hypertext Transfer Protocol ("HTTP") requests for one or more Hypertext Markup Language ("HTTP") content browsers.

20. The method of claim 19, further comprising:
generating video content capturing said processing of the one or more HTTP requests for the one or more HTTP content browsers;
wherein the one or more test results from executing the one or more test cases includes the video content.

* * * * *